United States Patent [19]

Martin

[11] 4,400,960
[45] Aug. 30, 1983

[54] TOOL FOR SETTING BLIND FASTENERS

[76] Inventor: Alan Martin, 42 Lantern La., Sharon, Mass. 02067

[21] Appl. No.: 263,140

[22] Filed: May 13, 1981

[51] Int. Cl.³ .............................................. B21J 15/34
[52] U.S. Cl. ..................................................... 72/114
[58] Field of Search ......................... 72/391, 114, 454; 411/40, 41, 42

[56] References Cited

U.S. PATENT DOCUMENTS

| | | | |
|---|---|---|---|
| 2,641,378 | 6/1953 | Wilt | 72/391 |
| 3,263,466 | 8/1966 | Shackelford | 72/114 |
| 3,587,271 | 6/1971 | Rigot | 72/114 |
| 3,683,740 | 8/1972 | Martin | 411/40 |
| 3,861,185 | 1/1975 | Maddox | 72/114 |
| 4,121,444 | 10/1978 | Duran | 72/114 |
| 4,201,072 | 5/1980 | Snell | 72/114 |
| 4,285,225 | 8/1981 | Snell | 72/114 |

*Primary Examiner*—Gene Crosby
*Attorney, Agent, or Firm*—Wolf, Greenfield & Sacks

[57] ABSTRACT

An inexpensive hand tool for setting threaded blind fasteners comprising an hexagonal sleeve having an axially extending unthreaded bore therethrough and a bit having a threaded body extending out of the sleeve and adapted to be threaded into the base of the threaded fastener. An Allen wrench socket is recessed in the opposite end of the bit. By means of an open end wrench for holding the sleeve against rotation and an Allen wrench for rotating the bit, the fastener is collapsed and the base is drawn into the fastener body.

2 Claims, 5 Drawing Figures

TOOL FOR SETTING BLIND FASTENERS

INTRODUCTION

This invention relates to hand tools for setting threaded blind fasteners and more particularly comprises a new and improved tool which is very inexpensive and is exceedingly small. The tool is particularly directed to the consumer market and may be sold at a very low retail price or be given away, to enhance the sale of the fasteners for which it is designed.

There are presently on the market a variety of hand tools for setting threaded blind fasteners. However, even the most inexpensive tools made for that purpose cost a substantial sum, and clearly none is so inexpensive as to be considered as a possible premium to promote the sale of the fasteners. Most of the tools made for setting such fasteners are in fact power operated and, therefore, can only be used where a convenient electrical outlet is provided, and they are quite costly.

The principal object of the present invention is to provide a very inexpensive, yet effective, tool for setting threaded blind fasteners.

Another important object of this invention is to provide an inexpensive tool for setting blind fasteners, which can be operated with the aid of standard tools that are owned by the most amateur carpenters and do-it-yourself devotees.

To accomplish these and other objects the hand tool of the present invention includes a sleeve with an axially extending unthreaded bore therethrough, in which is position for rotation a threaded bit. The bit which extends out one end of the sleeve is designed to be screwed into the threaded base of the fastener to be set by the tool. The sleeve itself is sized so as to be held against rotation by a open end wrench, and the opposite end of the bit is provided with a socket to receive an Allen wrench. Merely by threading the bit into the fastener and placing the fastener in the desired position in the work and holding the sleeve with an open end wrench against rotation, the fastener may be set by turning the bit with the aid of an Allen wrench.

These and other objects and features of this invention will be better understood and appreciated from the following detailed description of one embodiment thereof, selected for purposes of illustration and shown in the accompanying drawing.

BRIEF FIGURE DESCRIPTION

DETAILED DESCRIPTION OF THE DRAWINGS

Figure 1:
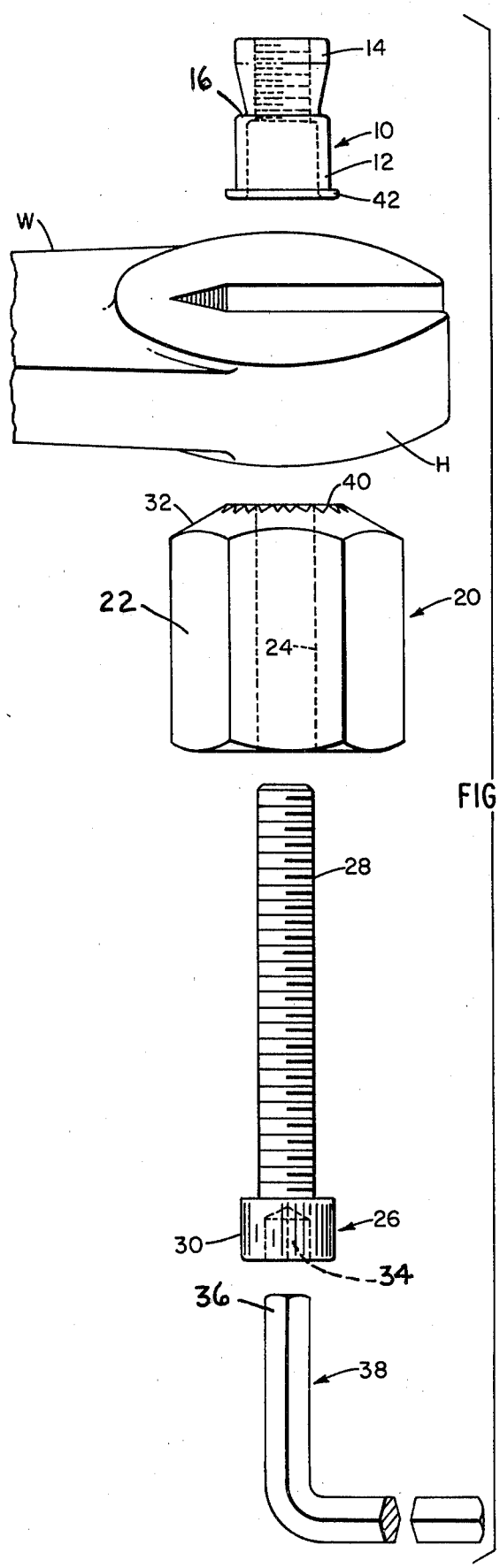
FIG. 1 is an exploded side view showing the various elements of the tool of this invention along with its operating tools and the fastener to be set by it.
Figure 5:
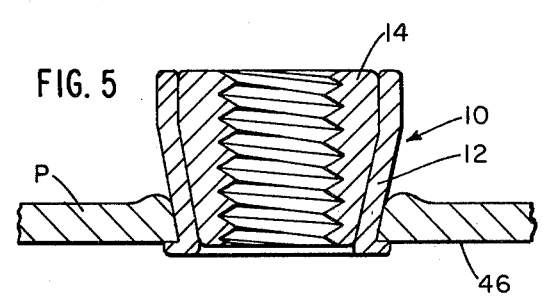
FIG. 5 is a cross sectional view showing the fastener set and the tool removed.
Figure 2:
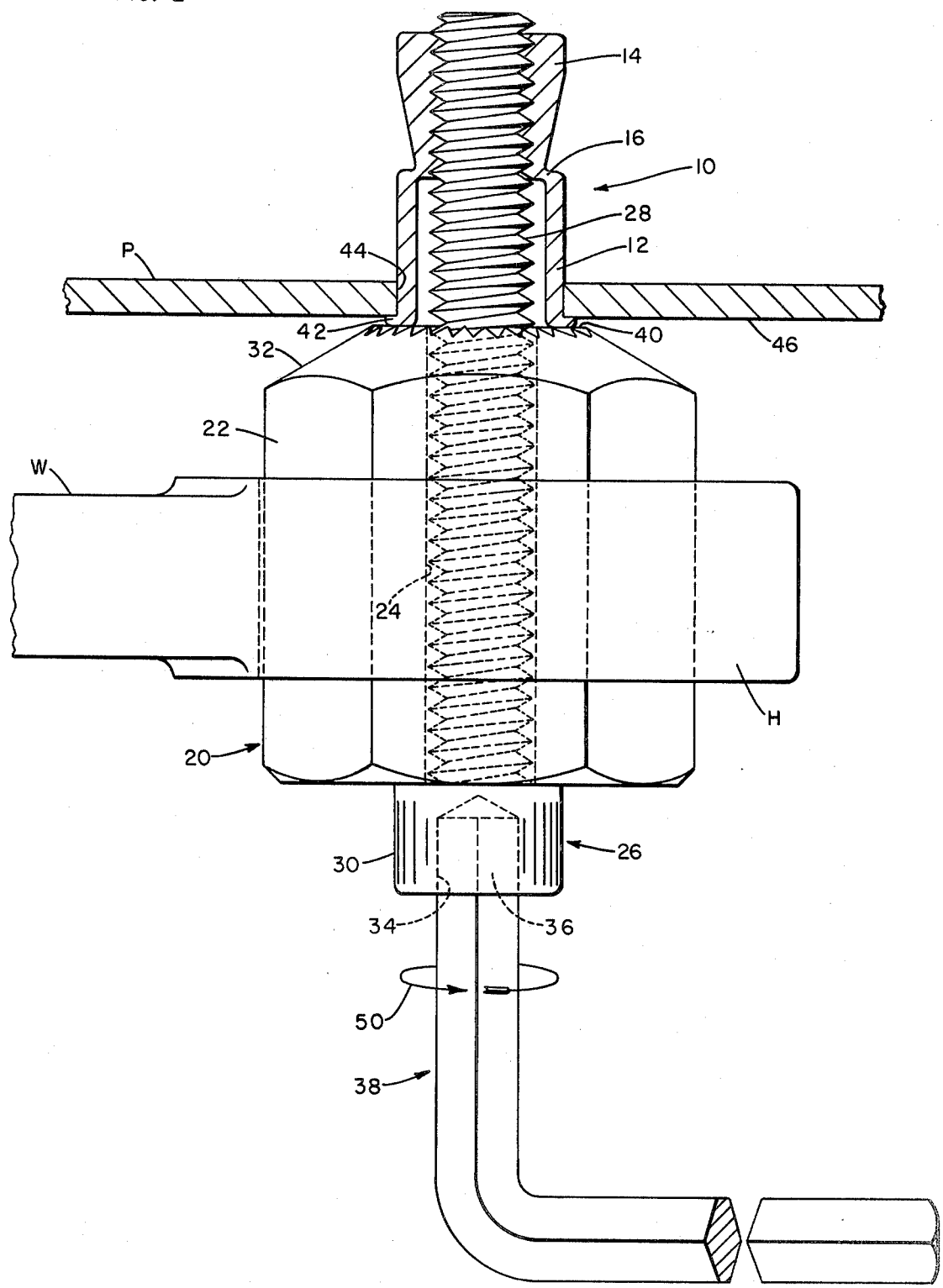
FIG. 2 is a greatly enlarged side view showing the tool of this invention engaging a fastener to be set by the tool.

The threaded blind fastener adapted to be set by the tool of this invention is shown in FIGS. 1 and 2. The fastener 10 is a one piece threaded insert having a body 12 and base 14. The base is conically shaped and is intended to be drawn into the body 12 by fracturing the shoulder 16. The tapered base 14 wedges into the body 12 so as to expand the body and thereby locking it in place in the work piece in which it is to be mounted. A fully set fastener is shown in FIG. 5. It is to be understood that the fastener itself forms no part of the present invention, but rather the invention is limited to the tool for setting the fastener.

The tool of this invention includes a sleeve 20 which typically may be approximately one half inch long and have an hexagonal outer surface 22 with the faces of the opposite flats defining a diameter of one half inch for the sleeve so that it may be engaged by a half inch open end wrench. The sleeve 20 has a smooth axial bore 24, but otherwise has the appearance of an elongated hexagonal nut.

Extending through the bore 24 and freely rotatable in it is bit 26 which has a threaded stem 28 and head 30. The threaded stem 28 of the bit is sized to screw into the internally threaded base 14 of the fastener 10. It will be noted in FIG. 2 that the bit 28 extends a substantial distance beyond the end 32 of the sleeve 20, and the head 30 of the bit is larger than the bore 24 so as to prevent the bit from moving out the top end as viewed in FIG. 2. The head 30 of the bit is countersunk with a hexagonal socket 34 specifically sized to receive the working end 36 of Allen wrench 38.

Sleeve 20 is provided with a knurled anvil 40 which is intended to engage the flange 42 of the fastener 10 when the fastener is being set in position. The knurled head prevents the fastener from rotating relative to the sleeve which action is necessary to set the fastener as is described below.

To set the fastener 10 an operator must have an open end wrench or some similar tool which is either adjustable or specifically sized to engage the flats of the sleeve surface 22 so as to prevent the sleeve from rotating. The operator must also empty an Allen wrench or other similar socket-type tool sized to engage the socket 34 in the head 30 of the bit so as to rotate the bit in the sleeve 20. To set the fastener, the operator places the bit 26 in the bore 24 of sleeve 20 and threads it into the base 14 of the fastener until the flange 42 of the fastener rests firmly against the anvil 40 of the sleeve. With the bit, sleeve and fastener assembled in that fashion, the operator installs the fastener into position in the panel or other work piece which is prebored to receive the fastener. The bore 44 in work piece P as shown in FIG. 2 should be sized to receive the body 12 of the fastener with minimum clearance.

Figure 3:
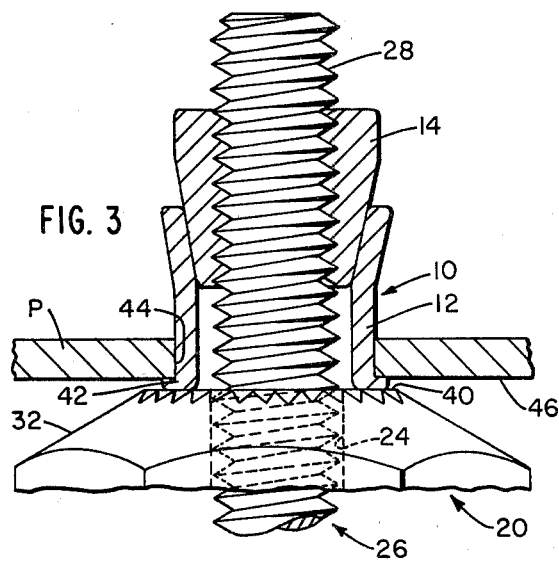
FIG. 3 is a fragmentary view of the tool and the fastener shown in its partially set state.
Figure 4:
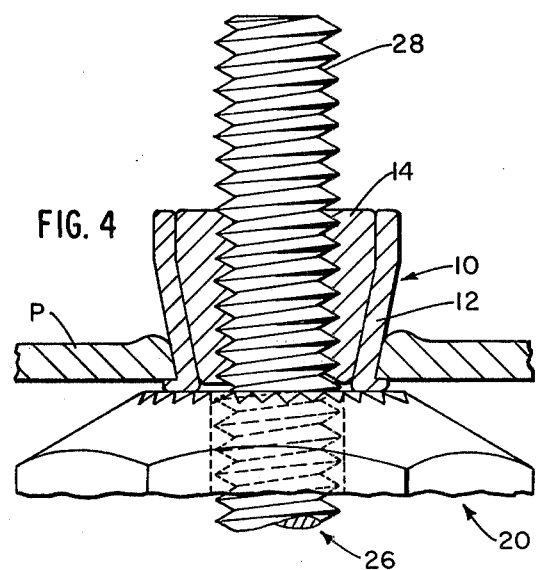
FIG. 4 is a fragmentary view similar to FIG. 3 but showing the fastener completely set.

With the flange 42 bearing against the outer surface 46 of the work P, the operator holds the sleeve with the head H of the wrench W against rotation, and inserts the operating end 36 of the Allen wrench 38 in place as shown in FIG. 2. By rotating the Allen wrench as suggested by arrow 50 so as to rotate the bit in the same direction required to screw its stem into the base 14 of the fastener, the shoulder 16 of the fastener is fractured and the base 14 is drawn into the body 12 causing the body to expand and thereby lock the fastener in place. In FIG. 3 the partially set fastener is shown with the base 14 drawn part way into the body 12, and in FIG. 4 the base 14 is shown in its final position. The expanded body 12 is in that fashion locked securely in place so that it will not spin in the hole 44 of the work panel P. Once the fastener is set in that fashion, the operator need merely turn the Allen wrench in the opposite direction so as to unthread the stem 28 from the base 14 which leaves the fastener in the position shown in FIG. 5.

Having described the invention in detail, those skilled in the art will appreciate its simplicity and effectiveness. Obviously the sleeve and bit are very inexpensive to manufacture, and they enable the user to operate the tool only with the aid of conventional tools, which may be present in any even nominally equipped tool box. Alternatively, the tool may be sold as a unit not only with the sleeve and bit but with a very inexpensive stamped open end wrench and Allen-type wrench. Even with the Allen wrench and open end wrench, the tool package may be made to sell for just a few dollars.

It will, of course, be appreciated that the tool may be used for setting fasteners of different types. For example, while the fastener 10 shown in the drawings has a smooth outer surface on its base 14, that surface could be threaded along with threads on the inner face of the body 12 as shown in applicant's U.S. Pat. No. 3,683,740 dated Aug. 15, 1972 and entitled "Threaded Blind Fastener".

Having described the invention in detail, those skilled in the art will appreciate that modifications may be made thereof without departing from its spirit. Therefore, I do not intend to limit the scope of this invention to the single embodiment illustrated and described. Rather, it is intended that the scope of this invention be determined by the appended claims and their equivalents.

What is claimed is:

1. A hand tool for setting threaded blind fasteners having a body and internally threaded base which in the preset condition are axially aligned and connected end to end with one another by a fracturable shoulder, said fastener when set having its base lying within the body with the shoulder fractured and expanding the body to hold it in position comprising
    a sleeve having a hexagonal outer surface sized to be engaged by a conventional open end wrench against rotation and having a bore therethrough and a fixed anvil at its end to engage the fastener body to prevent it from rotating,
    a threaded bit rotatably mounted in the sleeve and extending out of the sleeve and being sized to enable one end to thread into the base of the fastener to be set by the tool with the free end of the body of the fastener bearing against the anvil of the sleeve,
    and an Allen wrench socket at the other end of the bit and an Allen wrench to be received by the socket for rotating the bit relative to the sleeve to fracture the shoulder of the fastener and draw the base of the fastener into the body thereof.

2. A hand tool for setting threaded blind fasteners as defined in claim 1 further characterized by
    said bit having a head at said other end with a larger diameter than the bore in the sleeve for preventing the head of the bit from passing through the bore.

* * * * *